(12) United States Patent
Ahn et al.

(10) Patent No.: US 11,554,668 B2
(45) Date of Patent: Jan. 17, 2023

(54) CONTROL SYSTEM AND METHOD USING IN-VEHICLE GESTURE INPUT

(71) Applicant: HYUNDAI MOBIS Co., Ltd., Seoul (KR)

(72) Inventors: Sung Joon Ahn, Yongin-si (KR); Myung Bin Choi, Seoul (KR); Kyung Hoon Kim, Yongin-si (KR); Seung Hwan Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 289 days.

(21) Appl. No.: 16/910,633

(22) Filed: Jun. 24, 2020

(65) Prior Publication Data
US 2020/0406752 A1   Dec. 31, 2020

(30) Foreign Application Priority Data

| Jun. 25, 2019 | (KR) | 10-2019-0075605 |
| Jun. 25, 2019 | (KR) | 10-2019-0075606 |
| Jun. 25, 2019 | (KR) | 10-2019-0075607 |
| Jun. 25, 2019 | (KR) | 10-2019-0075608 |

(51) Int. Cl.
*B60K 35/00* (2006.01)
*G06F 3/01* (2006.01)
*G06V 40/20* (2022.01)

(52) U.S. Cl.
CPC .............. *B60K 35/00* (2013.01); *G06F 3/017* (2013.01); *G06V 40/28* (2022.01); *B60K 2370/11* (2019.05); *B60K 2370/148* (2019.05); *B60K 2370/1464* (2019.05); *B60K 2370/152* (2019.05)

(58) Field of Classification Search
CPC .................. B60K 35/00; B60K 37/06; B60K 2370/1464; B60K 2370/21; B60K 2370/1575; B60K 2370/11; B60K 2370/148; B60K 2370/152; G02B 27/01; G06F 3/038; G06F 3/04842; G06F 3/04883; G06F 3/167; G06F 3/017; G06F 3/0488; G06F 3/0304; G06F 3/0485;
(Continued)

(56) References Cited

U.S. PATENT DOCUMENTS

| 2014/0309875 | A1* | 10/2014 | Ricci | G08B 21/18 701/36 |
| 2015/0212584 | A1* | 7/2015 | Aoyama | G06V 20/59 345/173 |
| 2016/0368382 | A1* | 12/2016 | Schlittenbauer | B60K 37/06 |

(Continued)

FOREIGN PATENT DOCUMENTS

KR   10-2015-0072074   6/2015

*Primary Examiner* — Christopher E Leiby
(74) *Attorney, Agent, or Firm* — H.C. Park & Associates, PLC

(57) ABSTRACT

A control system and method for controlling a vehicle's functions using an in-vehicle gesture input, and more particularly, a system for receiving an occupant's gesture and controlling the execution of vehicle functions. The control system using an in-vehicle gesture input includes an input unit configured to receive a user's gesture, a memory configured to store a control program using an in-vehicle gesture input therein, and a processor configured to execute the control program. The processor transmits a command for executing a function corresponding to a gesture according to a usage pattern.

16 Claims, 19 Drawing Sheets

(58) Field of Classification Search
CPC ............ G06F 2203/0381; G06V 20/59; G06V 20/597; G06V 20/593; G06V 40/28; G06V 40/174
See application file for complete search history.

(56) References Cited

U.S. PATENT DOCUMENTS

| | | | |
|---|---|---|---|
| 2017/0120930 A1* | 5/2017 | Ling | B60W 50/10 |
| 2019/0213429 A1* | 7/2019 | Sicconi | G06F 3/0346 |
| 2019/0302895 A1* | 10/2019 | Jiang | G06F 3/016 |
| 2020/0247280 A1* | 8/2020 | Nakagawa | B60N 2/14 |
| 2022/0017109 A1* | 1/2022 | Hwang | B60Q 1/507 |

* cited by examiner

CONTROL SYSTEM AND METHOD USING IN-VEHICLE GESTURE INPUT

CROSS-REFERENCE TO RELATED APPLICATION

This application claims priority from and the benefit of Korean Patent Application Nos. 2019-0075605, 2019-0075606, 2019-0075607, and 2019-0075608 filed on Jun. 25, 2019, each of which is hereby incorporated by reference for all purposes as if set forth herein.

BACKGROUND

Field

Exemplary embodiments relate to a control system and method using an in-vehicle gesture input, and more particularly, to a system and method for receiving an occupant's gesture and controlling the execution of vehicle functions.

Discussion of the Background

Vehicles provide additional functions for user convenience such as audio, video, navigation, air conditioning control, and lighting control in addition to a basic driving function.

In order to perform these functions, vehicles receive an action command from a user through a button input, a touchscreen input, a gesture recognition, or the like.

A vehicle gesture recognition system is defined as an electronic system that collects data with machine vision and manipulates various in-vehicle driver support functions through an in-vehicle human-machine interface.

However, conventional vehicle gesture recognition technology merely receives a gesture and provides a function corresponding to the gesture. Therefore, drivers should learn each gesture to execute a corresponding function (e.g., to open and raise a hand up so as to increase the temperature of an air conditioner, to spread the index finger and the middle finger and raise the hand up so as to raise the volume of the audio, etc.), user convenience is low, and also it is not possible to perform different input control for the same gesture depending on the situation.

The above information disclosed in this Background section is only for enhancement of understanding of the background of the invention and, therefore, it may contain information that does not constitute prior art.

SUMMARY

Exemplary embodiments of the present invention provide a control system and method using an in-vehicle gesture input, the control system and method interpreting a gesture input in consideration of gesture input situation information and executing a preset function corresponding to the gesture input according to a result of the interpretation.

Additional features of the invention will be set forth in the description which follows, and in part will be apparent from the description, or may be learned by practice of the invention.

An exemplary embodiment of the present invention provides a control system using an in-vehicle gesture input, the control system including an input unit configured to receive a user's gesture, a memory configured to store a control program using an in-vehicle gesture input therein, and a processor configured to execute the control program. The processor transmits a command for executing a function corresponding to a gesture according to a usage pattern.

Another exemplary embodiment of the present invention provides a control method using an in-vehicle gesture input, the control method including (a) receiving operation state information and a gesture, (b) checking whether the operation state information satisfies a preset condition, and (c) providing different functions for the gesture according to whether the preset condition is satisfied.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
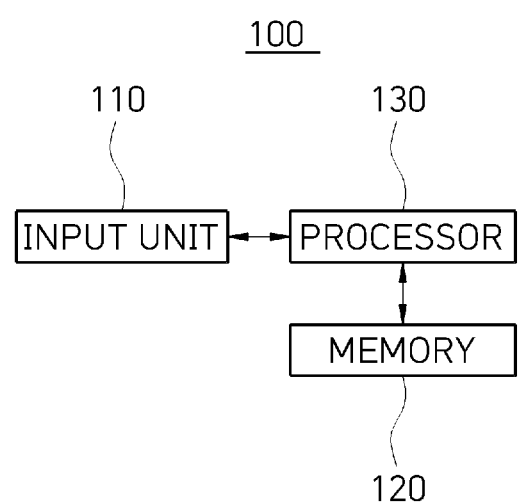
FIG. 1 is a block diagram showing a control system using an in-vehicle gesture input according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

These and other objects, advantages and features of the present invention, and implementation methods thereof will be clarified through the following embodiments described with reference to the accompanying drawings.

The present invention may, however, be embodied in different forms and should not be construed as limited to the embodiments set forth herein. Rather, these embodiments are provided so that this disclosure will fully convey the objects, configurations, and effects of the present invention to those skilled in the art. The scope of the present invention is defined solely by the appended claims.

The terminology used herein is for the purpose of describing particular embodiments only and is not intended to be limiting of the invention. As used herein, the singular forms "a," "an," and "the" are intended to include the plural forms as well, unless the context clearly indicates otherwise. The terms "comprises" and/or "comprising," when used in this specification, specify the presence of stated elements, steps, operations, and/or components, but do not preclude the presence or addition of one or more other elements, steps, operations, and/or components.

FIG. 1 is a block diagram showing a control system using an in-vehicle gesture input according to an embodiment of the present invention.

A control system 100 using an in-vehicle gesture input according to an embodiment of the present invention includes an input unit 110 configured to receive a user's gesture, a memory 120 configured to store a control program using an in-vehicle gesture input therein, and a processor 130 configured to execute the control program. The processor 130 transmits a command to perform different functions on the same gesture of a user according to the usage pattern.

The input unit 110 according to an embodiment of the present invention receives information obtained by a 3D camera (e.g., ToF, Structure, Stereo, and DSM (Driver Status Monitoring) cameras) detecting a gesture action of a user (a driver or a fellow passenger) and receives an operation state (usage pattern) involved in the user's gesture.

The processor 130 according to an embodiment of the present invention transmits a command for executing different in-vehicle functions for the same gesture according to the usage pattern including the operation state involved in the user's gesture.

Contact with a touchpad 300 or an armrest is an example of the operation state involved in the user's gesture.

Figure 2:
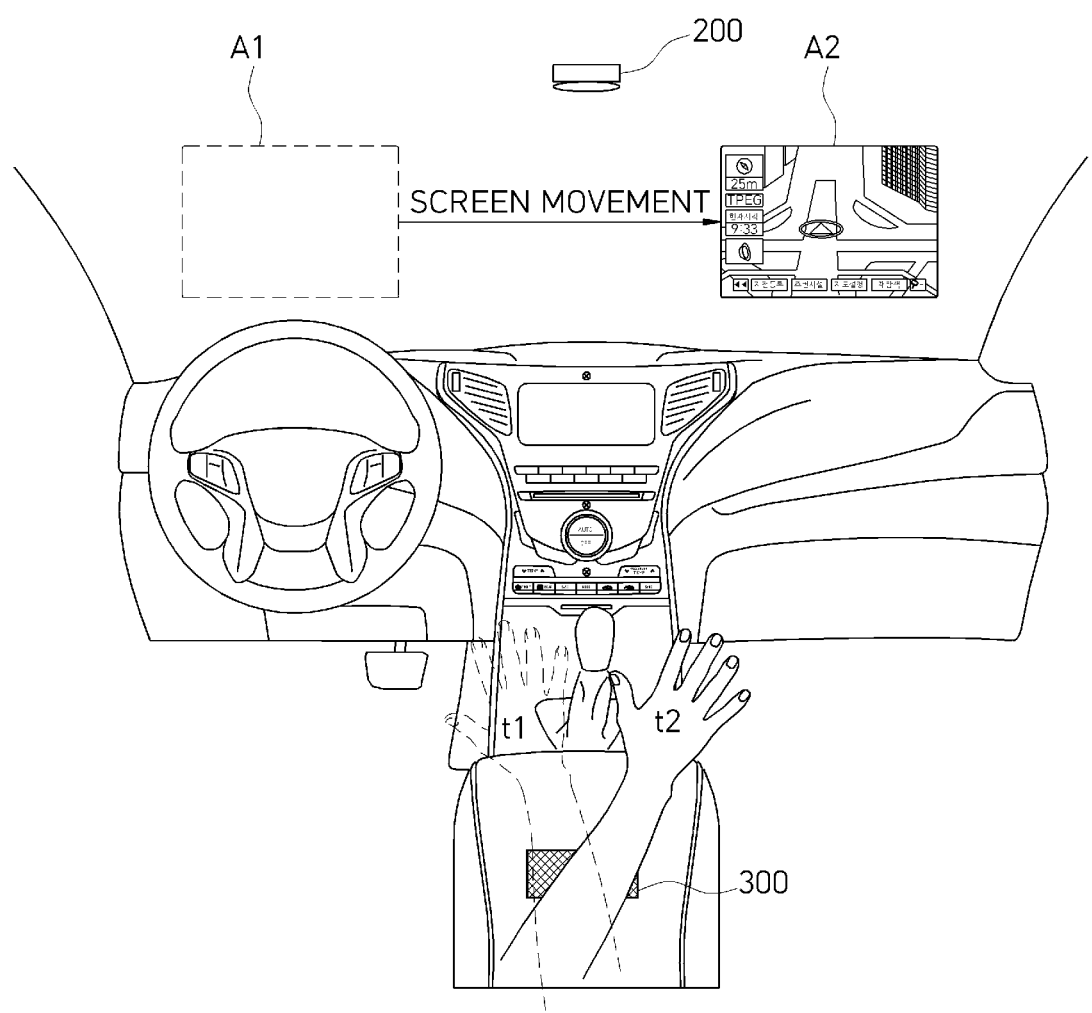
FIG. 2 is an exemplary diagram of a contact swipe gesture input in a control system using an in-vehicle gesture input according to an embodiment of the present invention.
Figure 3:
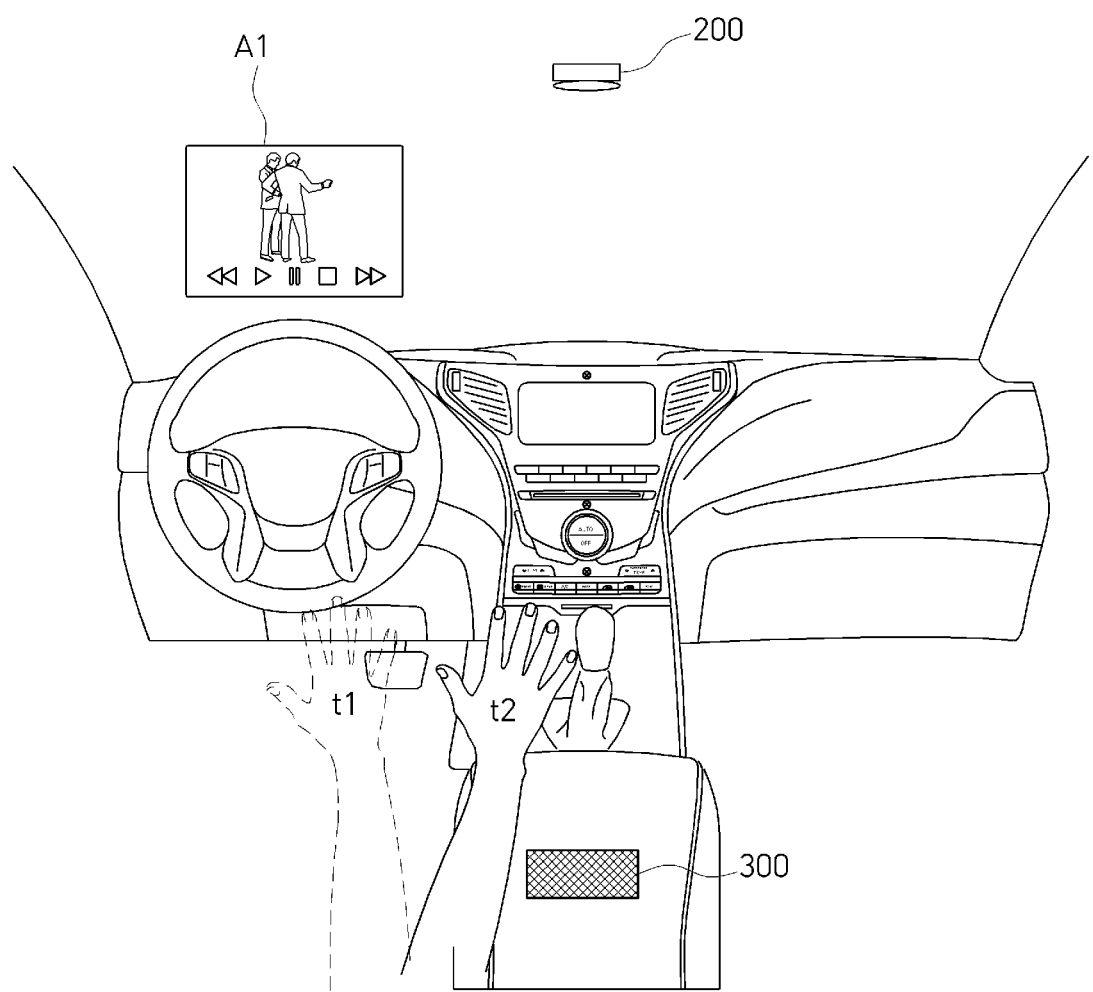
FIG. 3 is an exemplary diagram of a non-contact swipe gesture input in a control system using an in-vehicle gesture input according to an embodiment of the present invention.

FIG. 2 is an exemplary diagram of a contact swipe gesture input in a control system using an in-vehicle gesture input according to an embodiment of the present invention, and FIG. 3 is an exemplary diagram of a non-contact swipe gesture input in a control system using an in-vehicle gesture input according to an embodiment of the present invention.

In this case, as shown in FIGS. 2 and 3, it is assumed that a swipe gesture input is a gesture of a user swiping right with the right hand (t1→t2).

Referring to FIG. 2, a windshield area includes a first area A1 and a second area A2.

As shown in FIG. 2, when a user inputs a gesture of swiping right with the right hand while the arm is in contact with the touchpad 300, the input unit 110 receives information regarding a user gesture action, which is acquired by the camera 200, and receives information regarding an arm mounting state, which is acquired by the touchpad 300.

The processor 130 transmits a command for moving an image display area from the first area to the second area (A1→A2), and the command is an action command corresponding to the gesture and arm mounting state.

For example, as shown in FIG. 2, when a preset swipe gesture is input while the arm is in contact with the touchpad 300, a navigation screen may be moved from the first area A1 to the second area A2.

Referring to FIG. 3, when a user inputs a gesture of swiping right with the right hand (t1→t2) while the arm is not in contact with the touchpad 300, the input unit 110 receives information regarding a user gesture action, which is acquired by the camera 200, and receives information regarding an arm mounting state, which is acquired by the touchpad 300.

Through the corresponding gesture, the processor 130 transmits a "Rewind" command for image content currently being displayed in the first area A1.

For example, movie content is being displayed in the first area A1. The processor 130 transmits a "Rewind" command (◀◀), which is a function corresponding to the swipe gesture, among Play (▶), Pause (∥), Rewind (◀◀), Fast-forward (▶▶), and Stop (■) of the movie content and changes a play start point of the corresponding content (e.g., the play start point is changed from 1:00:04 at present to 0:59:54 which is 10 seconds ahead according to the swipe action).

According to an embodiment of the present invention, the function "Rewind" may be provided differently in consideration of a distance between a start point and an end point of a driver's swipe action (e.g., go back 10 seconds when the swipe action is shortened to 10 cm, and go back 30 seconds when the swipe action is lengthened to 30 cm).

That is, according to an embodiment of the present invention, different functions may be provided (a function of moving an area for displaying an image is provided when contact is made with a touchpad, and a function of moving a play start point of image content when contact is not made with a touchpad) for the same gesture (a gesture of swiping right with the right hand) according to an operation state (e.g., whether contact is made with a touchpad) involved in a user gesture.

The processor 130 according to an embodiment of the present invention differently performs a control corresponding to a gesture input according to a user's hand position and arm mounting form. For example, the processor 130 may give priority to a touch when a hand is in contact with a touchpad and may perform a manipulation corresponding to a gesture when a hand is away from a touchpad.

According to an embodiment of the present invention, a gesture recognition concept changes depending on whether contact is made with a touchpad or an armrest. For example, when a gesture is input to an IVI area while the elbow leans against a console touchpad or an armrest, the processor 130 recognizes an air gesture for a designated hand action and transmits a corresponding system operation command.

In this case, the system operation command includes switching an IVI display area screen, selecting a mode, executing an auxiliary function of other vehicles, etc.

According to an embodiment of the present invention, when a contact state is changed to a non-contact state, a user interface (UI) changes, and a manipulation gesture corresponding to a virtual touch (an air touch) is recognized.

A user may perform a virtual touch manipulation in a non-contact state by raising his or her arm to manipulate a windshield (a head-up display, a large screen display, etc.) or other items and may input a quick execution request through a virtual touch operation according to the change in the UI (the image included in the windshield or the IVI display).

Figure 4:
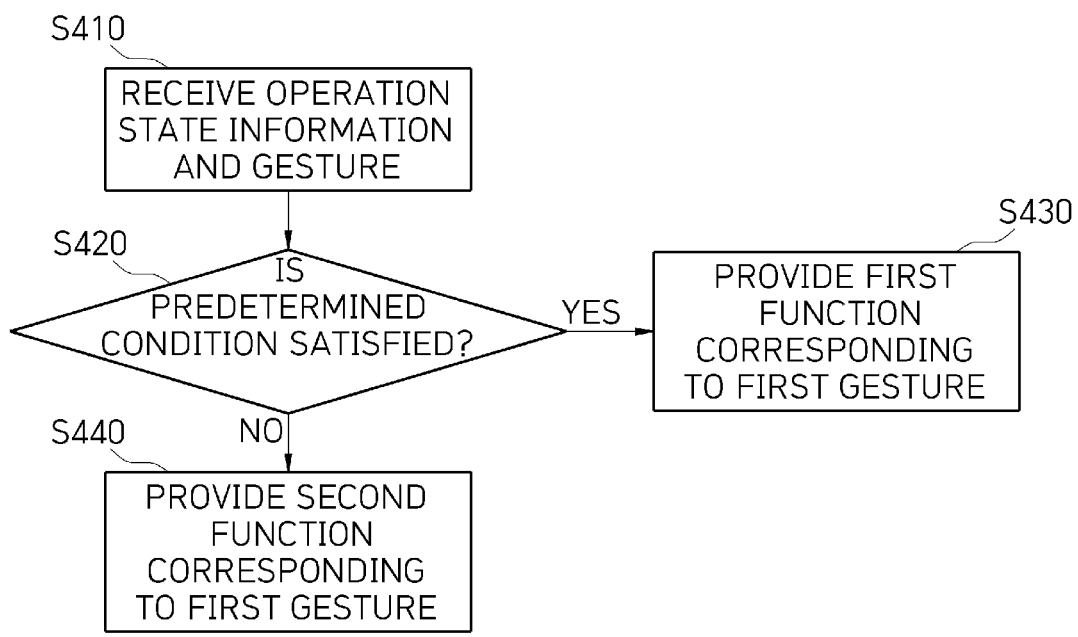
FIG. 4 is a block diagram showing a control method using an in-vehicle gesture input according to an embodiment of the present invention.

FIG. 4 is a block diagram showing a control method using an in-vehicle gesture input according to an embodiment of the present invention.

The control method using an in-vehicle gesture input according to an embodiment of the present invention includes receiving operation state information and a gesture (S410), determining whether the operation state information satisfies a preset condition (S420) and providing a first function or a second function corresponding to a first gesture according to whether the operation state information satisfies the preset condition (S430 and S440).

In S410, an occupant's gesture (e.g., an action of swiping right with a hand) is received from an image acquisition unit which recognizes an occupant's gesture in a vehicle, and also operation state information is received.

As an example, in S410, whether a user's arm is in contact with a touchpad is received as the operation state information.

In S420, it is determined whether the user's arm is in contact with the touchpad. In S430, a first function (a function of moving an area in which content is displayed) corresponding to the gesture (a first gesture) received in S410 is provided in S430 when the user's arm is in contact with the touchpad.

In S440, a second function (a function of adjusting or moving back a play start time of image content being displayed) corresponding to the gesture (the first gesture) received in S410 is provided when it is determined that the user's arm is not in contact with the touchpad in S420.

According to an embodiment of the present invention, it is possible to increase user convenience not only by recognizing a gesture but also by executing different functions for the same gesture depending on the situation to perform matching between gestures and functions in consideration of operation state information regarding the gestures.

As another example, in S410, a driver's emotional state, a driver's voice input state, a driver's drowsiness state, and the like are received as the operation state information. Accordingly, it is possible to provide different functions for the same gesture.

For example, in S410, it is assumed that a driver's emotional state is received as the operation state information and that music is being streamed.

In this case, the driver's emotional state is determined by analyzing used to analyze a face image of the driver acquired through an in-vehicle camera to determine whether the driver is calm or frowning (angry).

Alternatively, biometric information is shared from the driver's wearable device, and thus it is possible to check the driver's current emotional state.

Alternatively, through a schedule application of the driver's smartphone, it is possible to determine whether the driver is on vacation and thus feels calm or is on a tight schedule and thus feels tired.

When the face image of the driver acquired through the in-vehicle camera is determined as indicating that the driver is frowning and the driver inputs a gesture (an action of swiping right with the right hand) corresponding to a basic function of playing the next song in a playlist, in S420, it is determined that the driver's emotional state indicates that a preset condition corresponding to "angry" is satisfied, and in S430, a first function of recommending and streaming a song that makes the driver feel better as the next song is provided instead of just playing the next song in the playlist in response to the corresponding gesture.

In this case, in S430, a song to which a driver has listened and for which good feedback has been provided is recommended and streamed. Alternatively, a song loved by multiple different users is recommended and streamed through big data analysis. Alternatively, a song that the driver will like is recommended and streamed in consideration of season, weather, the driver's gender and age, the driver's favorite era, singer, and genre.

When the face image of the driver acquired through the in-vehicle camera is determined as indicating that the driver has a calm expression and the driver inputs a gesture of playing the next song (an action of swiping right with the right hand), in S420, it is determined that the driver's emotional state is calm such that a preset condition is not satisfied, and in S440, a second function (a basic function) for playing the next song in the playlist is provided on the basis of the corresponding gesture.

As another example, in S410, the driver's voice is received, and a gesture of raising the right hand up is received.

When it is determined in S420 that the driver says "temperature," a first function of determining that the driver's voice input controls an air conditioner and raising the set temperature by one degree is provided in S430.

When it is determined in S420 that the driver says "passenger seat window," a second function of determining that the driver's voice input controls opening or closing of a passenger seat window and raising and closing the passenger seat window is provided in S430.

As described above, according to an embodiment of the present invention, it is possible to provide different functions for the same gesture according to the operation state information involved in the user gesture.

Figure 5:
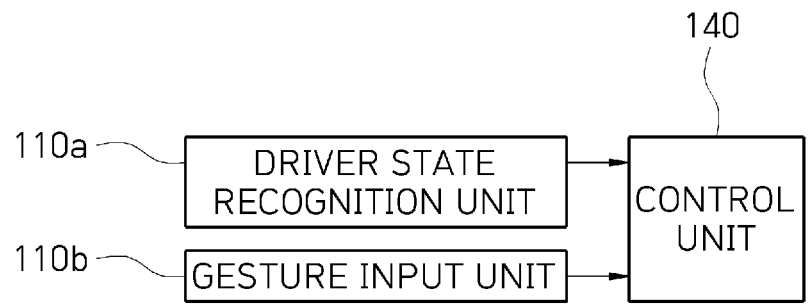
FIG. 5 is a block diagram of a control system using an in-vehicle gesture input according to another embodiment of the present invention.
Figure 6:
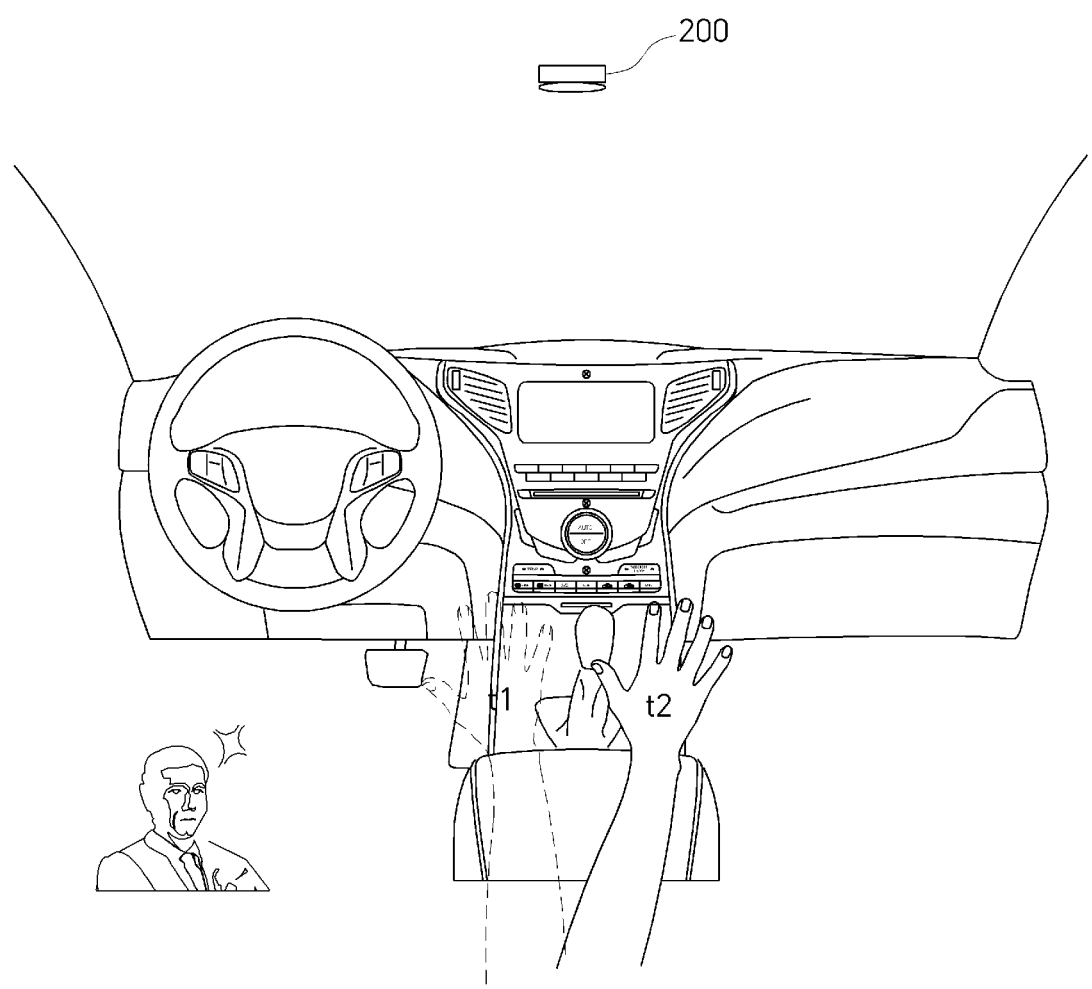
FIG. 6 is an exemplary diagram showing a gesture input control corresponding to a driver's emotional state in a control system using an in-vehicle gesture input according to another embodiment of the present invention.

FIG. 5 is a block diagram of a control system using an in-vehicle gesture input according to another embodiment of the present invention, and FIG. 6 is an exemplary diagram showing a gesture input control corresponding to a driver's emotional state in a control system using an in-vehicle gesture input according to another embodiment of the present invention.

A control system using an in-vehicle gesture input according to another embodiment of the present invention includes a driver state recognition unit 110a configured to recognize a driver's state, a gesture input unit 110b configured to receive gesture information, and a control unit 140 configured to selectively match and provide different functions to and for the same gesture information according to the driver's state and the gesture information.

The driver state recognition unit 110a is configured to receive a driver's emotion state information and may generate emotion state information from a driver's facial expression through an in-vehicle DSM camera, generate emotion state information from a driver's biometric information through the driver's wearable device, or generate a driver's psychological state information in connection with a schedule application of the driver's smart device.

An embodiment in which different functions are selectively matched to and provided for the same gesture information according to the driver's emotion state information and gesture information will be described below.

As shown in FIG. 6, when a gesture of swiping right with the right hand (t1→t2) is input while a driver is driving and listening to music, the gesture input unit 110b receives the driver's gesture information recognized through the camera 200.

A basic function connected with the gesture of swiping right with the right hand (t1→t2) is set to a function of playing the next song.

In this case, when the driver state recognition unit 110a classifies the driver's facial expression received through the camera 200 as "angry/agitated," the control unit 140 controls execution of a separate function to recommend and play a song that improve the driver's mood, rather than simply playing the next song in the playlist.

For example, the control unit 140 recommends and plays a song recommended as music that makes multiple users feel good, a corresponding user's favorite song (a user's favorite song having a history built as being mainly played based on season, weather, and time period), a song determined as having a change that makes a driver feel better through an analysis of driver data, and the like.

On the other hand, when the driver state recognition unit 110a classifies the driver's facial expression recognized through the camera 200 as "calm," the control unit 140 performs a control to play the next song in the playlist according to the basic function of the corresponding gesture.

According to this embodiment, it is possible to operate different functions for the same gesture depending on the driver's emotional state, which preferably corresponds to an entertainment function which is manipulated due to the gesture.

When it is determined through the driver state recognition unit 110a and the gesture input unit 110b that the driver's pleasant facial expression and the driver's hand or face motion are present, the control unit 140 performs a control to promote the driver's good mood through a mood lamp equalizing effect.

When the driver state recognition unit 110a recognizes the driver's frowning expression and the gesture input unit 110b recognizes a gesture of the driver blocking his or her nose, the control unit 140 performs a control to switch between outdoor and indoor units of an air conditioner or to operate an air cleaning mode.

A swipe action that is input through the gesture input unit 110b is basically set as a gesture for performing an action of changing a screen or content which is being displayed. When a call comes to the driver's smartphone connected with an in-vehicle system and a frowning face or a negative voice is recognized through the driver state recognition unit 110a, the control unit 140 transmits an incoming call rejection command according to the corresponding swipe action.

When the gesture input through the gesture input unit 110b is a gesture of the driver continuously touching or hitting his or her chest and the driver's frowning expression is recognized from the driver state recognition unit 110a, the control unit 140 performs a control to determine that the driver has an abnormal health condition and to inform the driver of a nearby hospital location.

Also, the control unit 140 transmits, to nearby rescue workers, hospitals, and the driver's acquaintances, and the like, a notification about the driver's abnormal health condition.

According to the aforementioned embodiment, even when a separate biometric sensor is not provided, it is possible to determine whether there is an abnormality in the driver's health state according to the driver's face recognition result and behavior analysis and to provide corresponding vehicle functions (e.g., hospital location guidance and rescue worker and acquaintance contact).

The control unit 140 switches a vehicle driving mode according to the state recognition result of the driver state recognition unit 110a.

The control unit 140 operates the vehicle in an autonomous driving mode when the driver's emotional state is classified as "angry/agitated." The control unit 140 automatically receives a selection of a mode for autonomous driving or manual driving from the driver or automatically executes a recently stored driving mode when the driver's emotional state is classified as "calm."

In this case, the driver state recognition unit 110*a* may receive emotion information from the driver's mobile terminal before the driver gets in the vehicle and may recognize the driver's emotional state through the above camera 200 or the like after the driver gets in the vehicle.

In addition, the driver state recognition unit 110*a* may not only recognize the driver's state from the driver's actions or facial expressions but may estimate the driver's state through external information such as a driving pattern during manual driving.

For example, when the driver is making a sudden departure, sudden stop, or sudden lane change, it is possible to estimate that the driver is driving in an "angry/agitated" state and to automatically change a driving mode or recommend a driving mode change according to a result of the estimation.

As the driving proceeds after the driver gets in the vehicle, the driver state recognition unit 110*a* monitors the emotional state, and the control unit 140 maintains the aforementioned autonomous driving mode or switches the manual driving mode to the autonomous driving mode in consideration of a result of the monitoring.

The control unit 140 performs a control to display the driver's emotional state to nearby vehicles.

In this case, a phrase may be displayed through an external communication display, or the driver's emotion state information is transmitted through V2V.

For example, when a driver of a vehicle "A" is manually driving in an "angry/agitated" state, the driving may be violent. In this case, the vehicle "A" may inform nearby vehicles of the driver's emotional state, and thus a nearby vehicle "B" (for an autonomous driving mode) or a driver of the vehicle "B" (for a manual driving mode) can prepare for the violent driving of the vehicle "A" (e.g., securing a safe distance and refraining from changing lanes ahead of the vehicle "A").

As another embodiment, the driver state recognition unit 110*a* receives state information regarding whether the driver is drowsy while driving.

When the state information indicates that the driver's state corresponds to the drowsy driving, such as the driver's eyes closing or head nodding, is recognized through the camera 200 or that the driver inputs a gesture of rubbing his or her eyes or squeezing the back of his or her neck through the gesture input unit 110*b*, the control unit 140 determines that the driver is drowsy while driving.

When a gesture of swiping right with the right hand (t1→t2) is input while the driver is driving and listening to music, the gesture input unit 110*b* receives the driver's gesture information recognized through the camera 200.

The gesture of swiping right with the right hand (t1→t2) is a gesture to play the next song. In this case, when the driver's drowsy driving is predicted through the driver state recognition unit 110*a* and the gesture input unit 110*b*, the control unit 140 may perform a control to recommend and play a song with a fast tempo that can remove the driver's drowsiness rather than simply playing the next song in the playlist.

Alternatively, according to the corresponding gesture, the control unit 140 plays the next song in the playlist in consideration of the driver's intention and increases the volume by 1.5 times in consideration of the driver's drowsy driving.

Figure 7:
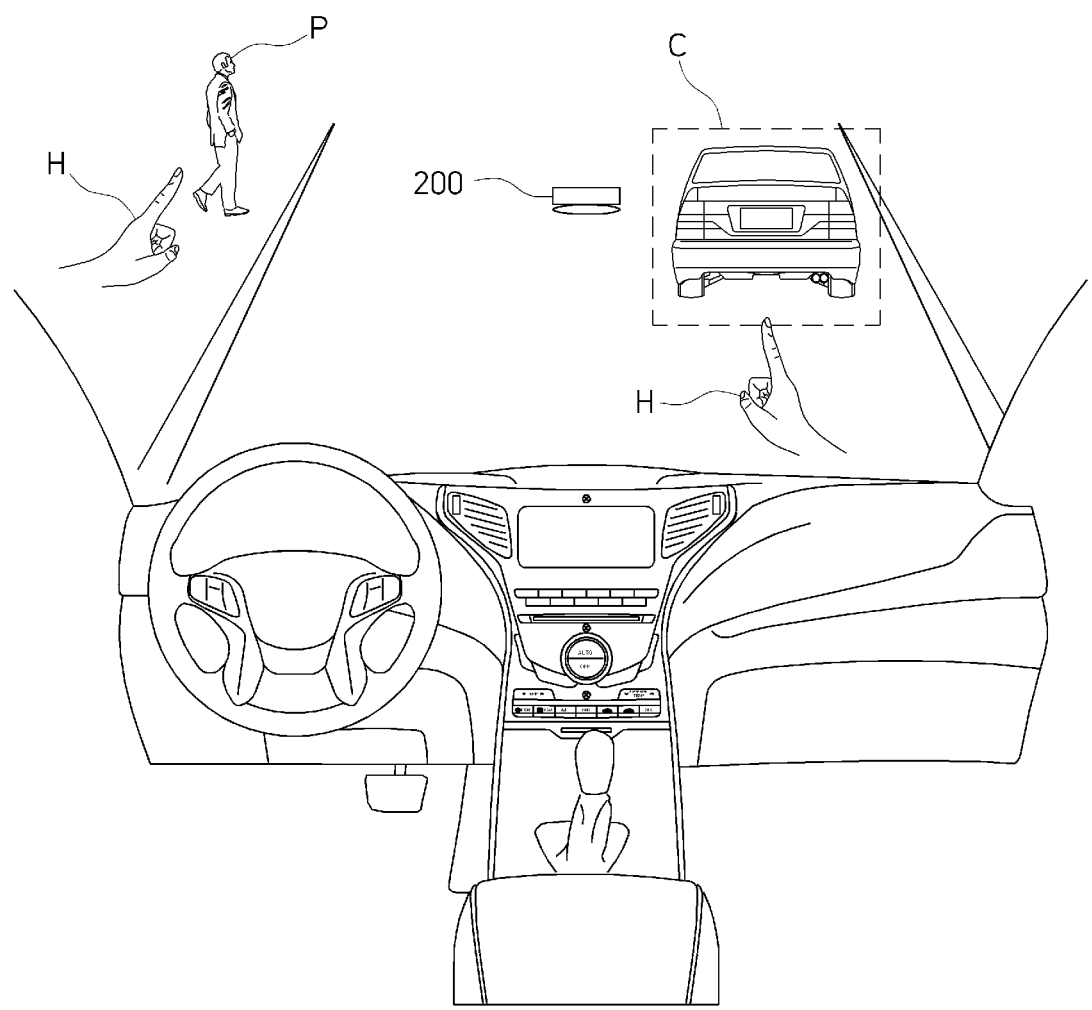
FIG. 7 is an exemplary diagram showing an object selection gesture in a control system using an in-vehicle gesture input according to another embodiment of the present invention.

FIG. 7 is an exemplary diagram showing an object selection gesture in a control system using an in-vehicle gesture input according to another embodiment of the present invention.

The control system using an in-vehicle gesture input according to another embodiment of the present invention includes an input unit configured to receive a user's gesture and voice, a memory configured to store a control program using an in-vehicle gesture input therein, and a processor configured to execute the control program. The processor transmits a device control command according to the user's gesture and voice.

Referring to FIG. 7, the driver inputs a gesture of selecting an object of interest near the vehicle using a hand H.

For example, another vehicle C, pedestrian P, traffic sign, building, and the like are present near the vehicle. The driver may conduct a gesture of selecting an external object using the hand H and also may track the driver's gaze information to select an external object.

According to this embodiment, the processor performs a control to display information (speed, vehicle type, vehicle number, and other vehicle sharing message information) regarding a selected front vehicle C according to a virtual gesture selection using the driver's hand, and the front vehicle information is displayed in various areas such as an audio, video, and navigation (AVN) screen, a cluster gauge, a head-up display (HUD), and a windshield glass.

The processor performs a control to display information (motion and distance from road) of a selected pedestrian, information (name, entered shops, and facilities) of a selected building, and information of a selected traffic sign according to a virtual gesture selection using the driver's hand, and the pieces of information are displayed in various areas as described above.

The input unit receives the driver's vocal utterance as well as the driver's gesture, and the processor transmits a message to a selected object (thing, vehicle, etc.) according to the voice reception.

Figure 8:
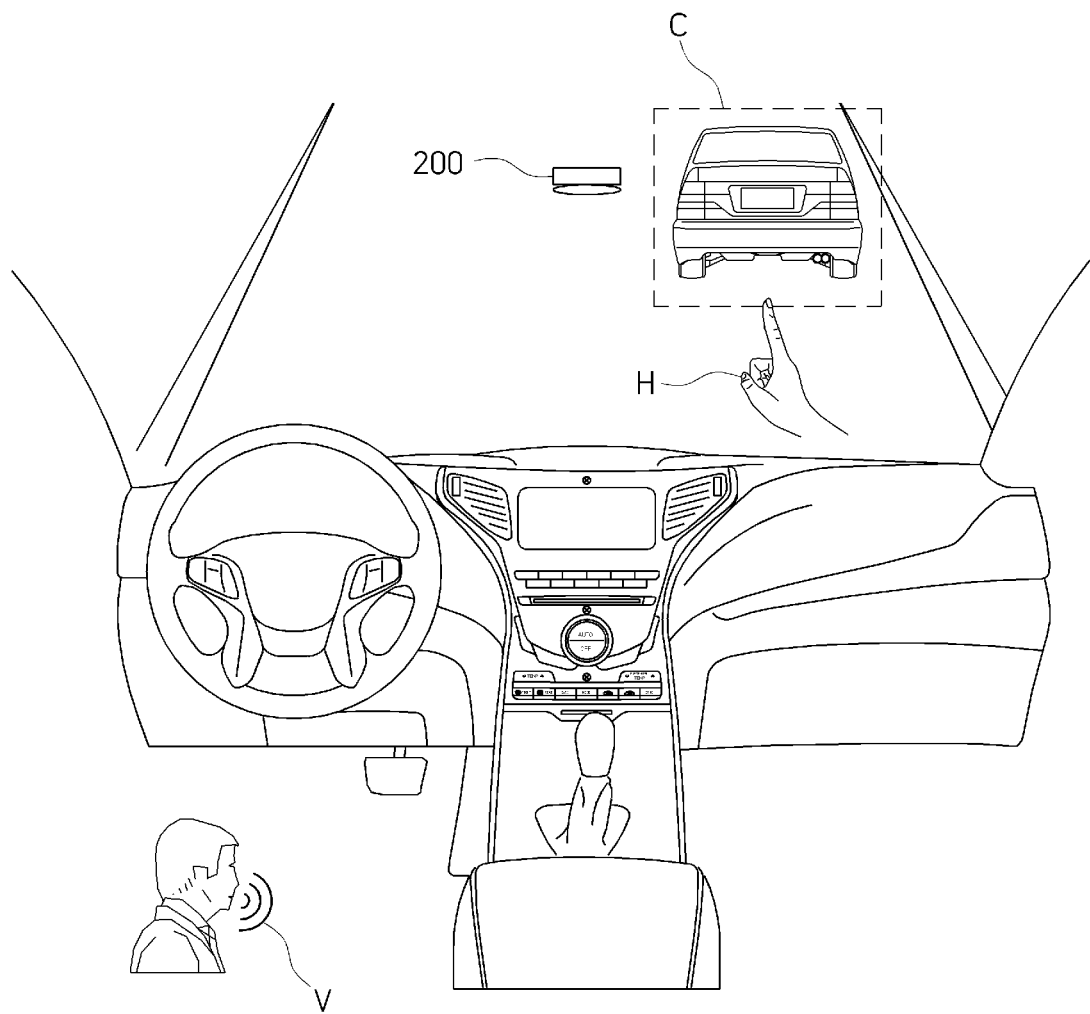
FIG. 8 is an exemplary diagram of a control corresponding to an object selection gesture and voice input in a control system using an in-vehicle gesture input according to another embodiment of the present invention.

For example, it will be described with reference to FIG. 8 that a taillight of the front vehicle C is broken.

The input unit receives object selection information indicating that the front vehicle C has been selected with the driver's hand H and receives voice information indicating that "the taillight is broken," which is the driver's voice.

The processor transmits a notification about a taillight failure to the front vehicle C, which is the corresponding object, according to the driver's gesture and voice, and the notification is provided through the windshield or AVN of the front vehicle through V2V.

Alternatively, the above-mentioned notification may be recognized by a driver of a corresponding vehicle C through an external communication device (e.g., a display for displaying text) of the vehicle. To this end, a text message indicating a taillight failure is displayed through an external communication device disposed on the rear side of the vehicle when the corresponding vehicle overtakes the vehicle, and a text message indicating a taillight failure is displayed through an external communication device disposed on a lateral side of the vehicle toward a corresponding vehicle when the corresponding vehicle is traveling alongside the vehicle.

For example, when a vehicle C is traveling without turning on a headlight in a night driving situation and a voice indicating "Turn on a lamp and drive safely" is input together with a gesture of selecting the corresponding vehicle C through the input unit, a text message indicating the voice is displayed through the above-described external communication device, or a notification is provided to the front vehicle through V2V.

Also, when the corresponding front vehicle C is swaying from side to side and drowsy driving is suspected, the input unit receives gesture information and receives voice information indicating "Be careful" by selecting the corresponding vehicle C with the driver's hand H.

In this case, the processor urgently transmits a message which is based on the voice information of the driver and which indicates not to drive drowsy to the front vehicle through V2V, and the message causes the front vehicle that has received the message to generate seat vibration and thus to provide an alarm to the driver of the front vehicle.

Also, as described above, the processor performs a control to display, as a text message, a notification message indicating not to drive drowsy to the corresponding vehicle C through an external communication device according to the driver's gesture and voice.

When the driver's voice indicating "Please make a reservation for XX people at OO o'clock" is input through the input unit along with a gesture of selecting a building near the vehicle, the processor delivers a reservation message to the building.

When the gesture of selecting the building near the vehicle is input through the input unit, the processor displays phone number information of the corresponding building. When a request for a call connection is received by the driver's voice or gesture, a call is originated to a corresponding phone number.

When the driver's voice indicating "Traffic accident, please call 119" is received along with a gesture of selecting a traffic sign through the input unit, the processor transmits an accident report message to 119 Control Center. In this case, by transmitting an accident report message including information (location information) of the traffic sign, the processor delivers information regarding safe and emergent situations according to information regarding the gesture of the driver selecting the traffic sign.

When a pedestrian P who is jaywalking near the vehicle is selected through the input unit and the driver's voice indicating "Don't jaywalk" is also input, the processor displays a warning phrase as a text message to the corresponding pedestrian through an external communication device.

The processor identifies a speaker, which is one of a driver and a passenger, and classifies the importance of a transmission message through the storage and determination of voice information.

The importance and the alarm control vary depending on whether the speaker is a driver or a passenger (passenger content filtering), and authority related to the importance is transferred from the driver to the passenger to allow delivery of messages.

Also, the processor delivers a common shared message through a voice so that information such as an in-front road situation can be checked by other vehicles.

Figure 9:
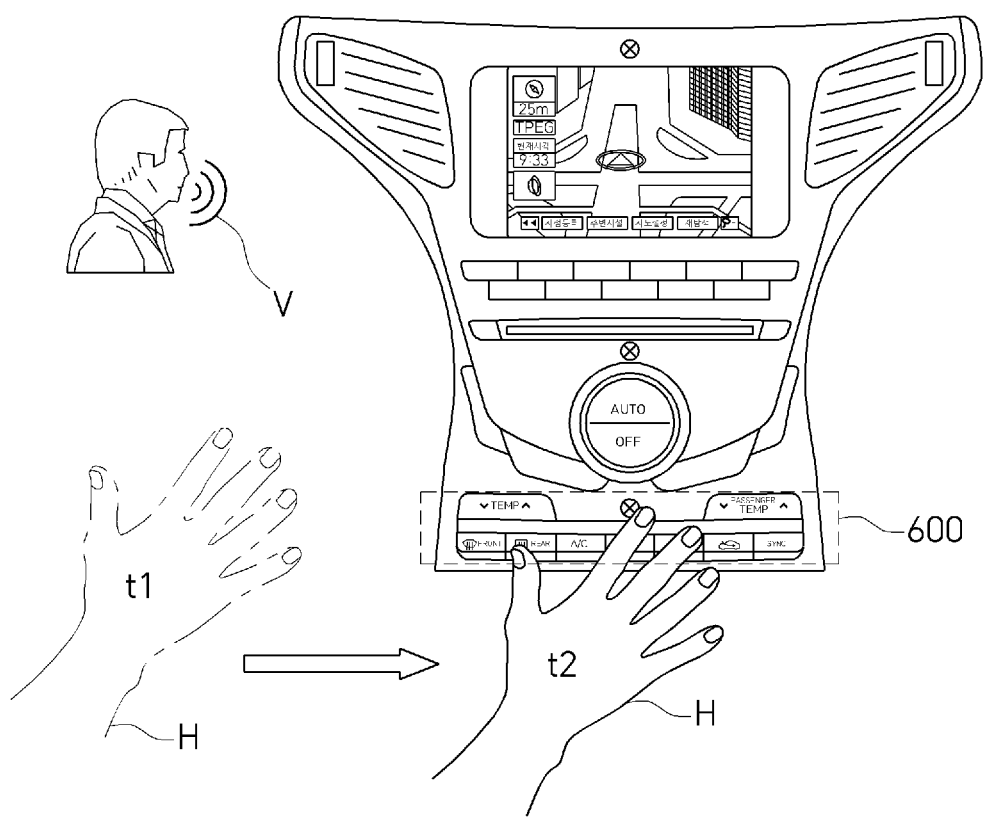
FIGS. 9 and 10 are exemplary diagrams of a control corresponding to a device selection gesture and voice input in a control system using an in-vehicle gesture input according to another embodiment of the present invention.
Figure 10:
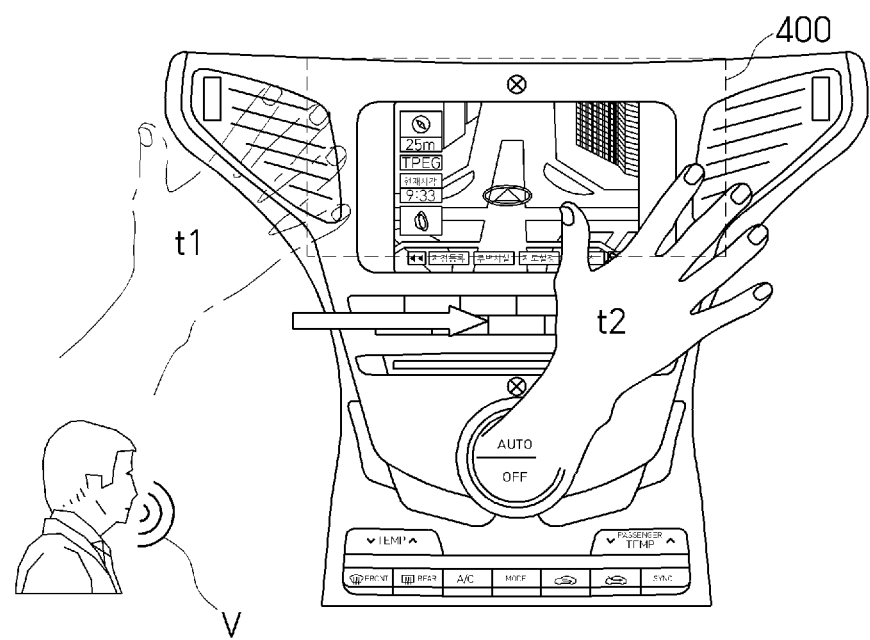

FIGS. 9 and 10 are exemplary diagrams of a control corresponding to a device selection gesture and voice input in a control system using an in-vehicle gesture input according to another embodiment of the present invention.

The processor performs a control to basically provide an air gesture or air touch function according to the driver's gesture received through the input unit.

This relates to basic gesture actions such as button clicking and mode execution and includes selection and execution of buttons and modes which are represented in the screen.

The input unit receives information regarding an in-vehicle device indicated by the user's gesture and also receives the user's voice information.

The processor executes an operation corresponding to the voice information (a short-cut function and a quick execution function) in consideration of the user's voice information and the information regarding the in-vehicle device selected according to the gesture received through the input unit.

As shown in FIG. 9, when the input unit receives a selection of the area of the air conditioner 600 according to a gesture of a user's hand H (t1→t2) and receives the user's voice (e.g., strong or weak with respect to air blowing; up, down, left, or right with respect to the air direction, an air conditioner, temperature, and the like with respect to an air conditioning mode, etc.), the processor controls operation execution for an air conditioner, which is an in-vehicle device corresponding to the area indicated by the user's hand.

As shown in FIG. 10, when the input unit receives a selection of the area of the navigation 400 according to a gesture of a user's hand H (t1→t2) and receives the user's voice (e.g., a destination), the processor controls operation execution, such as for moving to a destination search screen, for displaying a destination search list, or for automatically setting a destination.

When the input unit receives a selection of the area of an audio device according to a gesture of a user's hand H (t1→t2) and receives the user's voice (e.g., music file title, singer, genre, etc.), the processor controls operation execution, such as for moving to a music file search screen, for displaying a music file search list, or for automatically playing music according to the user's voice.

The processor controls the execution of devices in consideration of the driver's gesture and the driver's voice, and thus it is possible to differently control function execution even for the same gesture according to different voice inputs of the driver.

For example, when the driver says "volume" and performs a gesture of raising a hand up, the processor controls execution to increase the volume of the audio device. When the driver says "air blowing" and performs a gesture of raising a hand up, the processor controls execution to increase the air volume of the air conditioner.

Also, when the driver says "screen" and performs a gesture of raising a hand up, the processor controls execution to increase the brightness of the screen.

Also, when the driver says "navigation" and performs a gesture of raising a hand up, the processor enlarges a map screen.

When the driver's gesture is to touch his or her lips with the index finger and the driver's voice is "Hush," the processor mutes sound that is emitted from the AVN.

Also, when main functions are simultaneously performed, a short cut function may be provided through a specific gesture. When a call is incoming while the sound is being emitted from the AVN (listening to radio, music, etc.), the incoming call may be rejected through the gesture.

Also, when the driver says "music" and inputs a specific gesture, the processor searches (drags) a content/menu/play list according to the gesture. When the driver says "OK, stop," the processor stops a selection window in a position or range of a corresponding music file.

Also, when the driver makes a gesture of raising his or her thumb up along with positive language (e.g., good, best, etc.) while listening to music, the processor may perform a procedure including storing information about the music, downloading a music file, adding the music to the playlist, and transmitting positive feedback through in-vehicle SNS.

The processor transmits an image (e.g., entertainment in a windshield display) selected through a gesture and other input information (a touch, a voice, a surrounding environment, etc.) to other devices (a mobile terminal, a backseat passenger display, other vehicles).

In this case, when the image is transmitted to the backseat passenger display, the screen is transmitted without modification. When the image is transmitted to the mobile terminal, essential information is extracted in consideration of a screen size, and a modified image is transmitted.

When the image is transmitted to other vehicles, the transmission is performed through V2X communication and is executed in consideration of congestion control in traffic congestion areas.

In this case, when a packet loss rate is high, the image is not transmitted and only safety-related information is transmitted.

The processor transmits only a gesture symbol without transmitting image information itself, and a device which has received the gesture symbol processes a subsequent function control corresponding to the gesture symbol. Thus, it is possible to reduce the amount of data packets.

Figure 11:
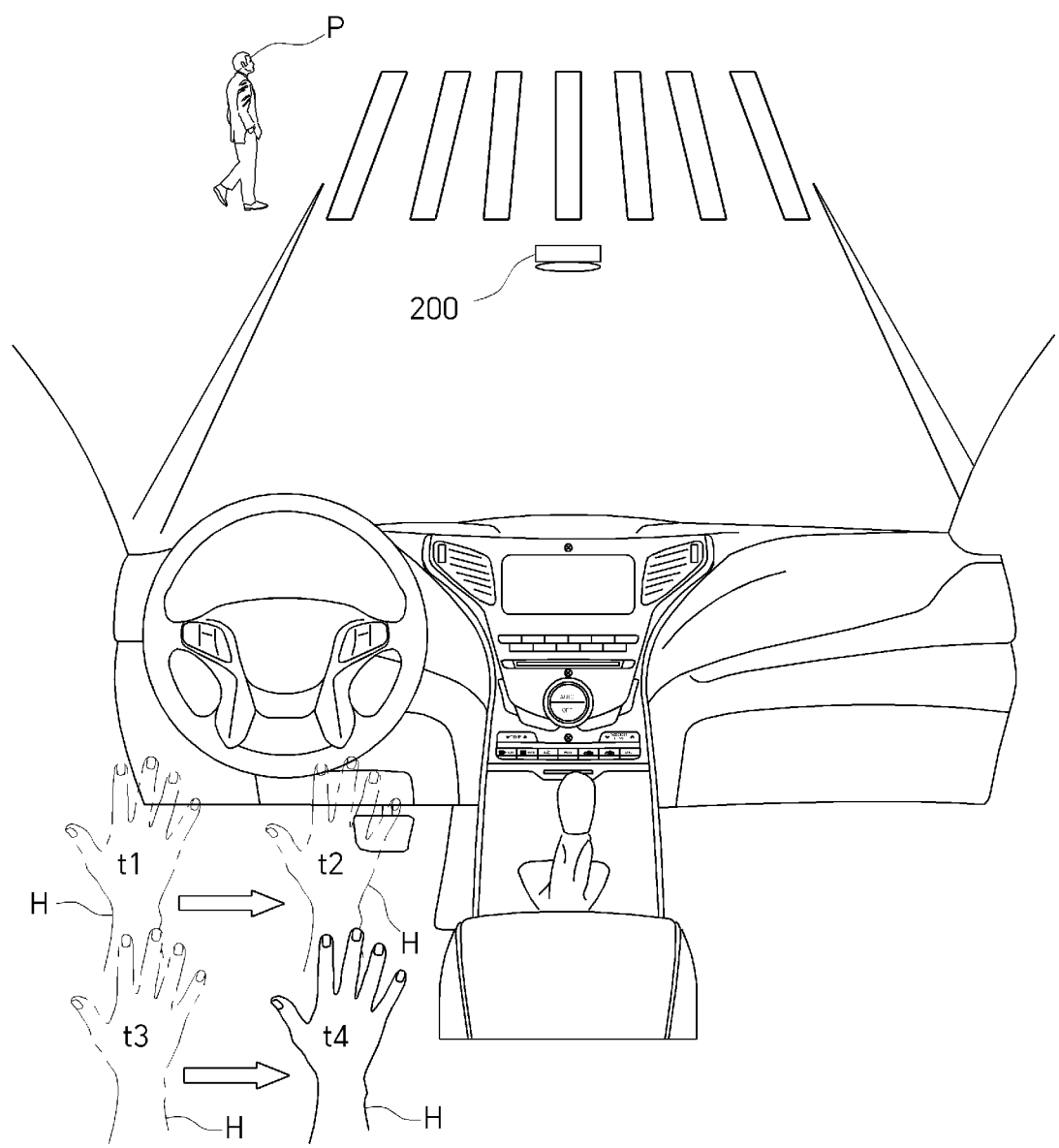
FIG. 11 is an exemplary diagram showing a gesture input for a pedestrian guidance indication in a control system using an in-vehicle gesture input according to another embodiment of the present invention.

FIG. 11 is an exemplary diagram showing a gesture input for a pedestrian guidance indication in a control system using an in-vehicle gesture input according to another embodiment of the present invention.

The control system using an in-vehicle gesture input according to another embodiment of the present invention includes an input unit configured to receive surrounding situation information and a user's gesture, a memory configured to store a control program using an in-vehicle gesture input therein, and a processor configured to execute the control program. The processor transmits a command to execute different functions for the same gesture of the user according to the surrounding situation information and the user's gesture.

In this embodiment, information regarding whether there is a pedestrian who tries to cross a road at a crosswalk in front of the vehicle is used as the surrounding situation information.

Referring to FIG. 11, there is a pedestrian P who is waiting to cross at a crosswalk in front of the vehicle (at a crosswalk with no traffic lights), and the driver inputs a gesture of waving a hand (t1→t2→t3→t4) to instruct the pedestrian to cross.

Conventionally, pedestrians cross after perceiving that a vehicle will stop by looking at the driver's hand signal. Such identification is difficult when the inside of the vehicle is not visible because of a tinting or a night driving situation. Therefore, in this embodiment, the processor performs a control to display a message for crossing a road to a pedestrian through the driver's gesture recognized through the in-vehicle camera 200.

Figure 12:
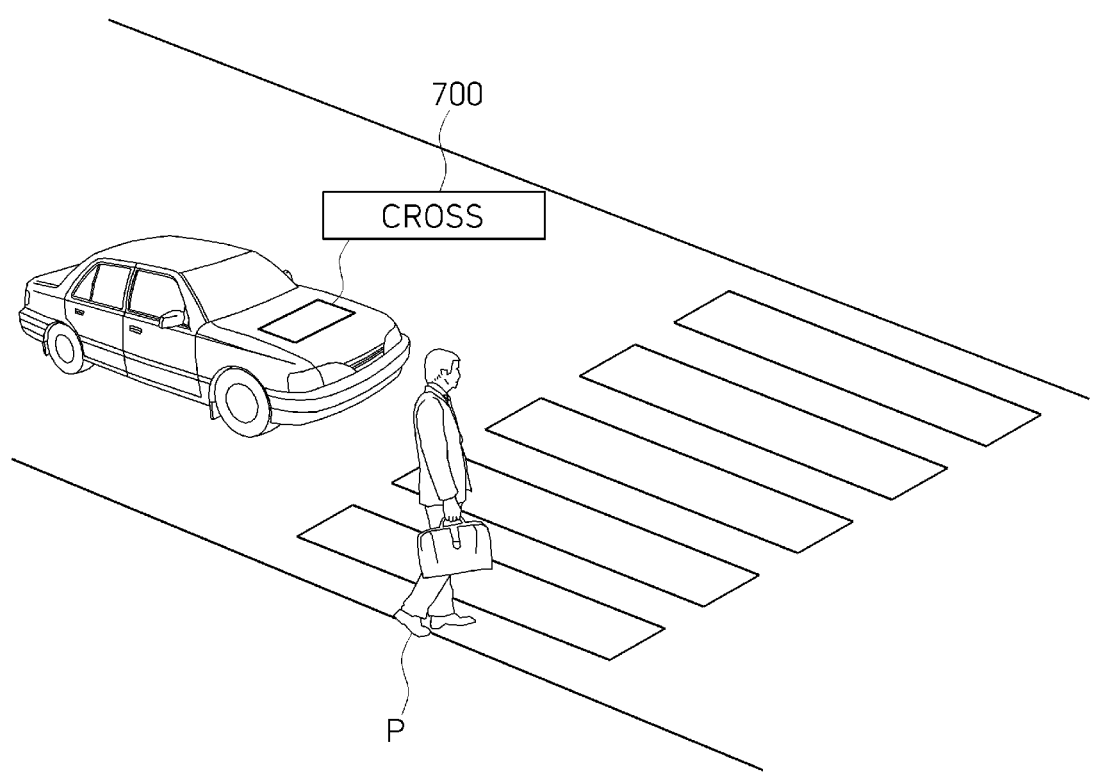
FIG. 12 is an exemplary diagram showing a phrase indication for a pedestrian in a control system using an in-vehicle gesture input according to another embodiment of the present invention.

Referring to FIG. 12, when a user's gesture as shown in FIG. 11 is received in the above-described situation, an external communication device 700 disposed on the front side of the vehicle displays a phrase "Cross" and enables the pedestrian P to check the phrase and then cross.

Such pedestrian guidance may be provided through an external directional speaker or the like in the form of an audio message as well as the above-described text message.

Further, it is also possible to induce pedestrians to cross by illuminating a crosswalk in a green color through an external lighting device.

Figure 14:
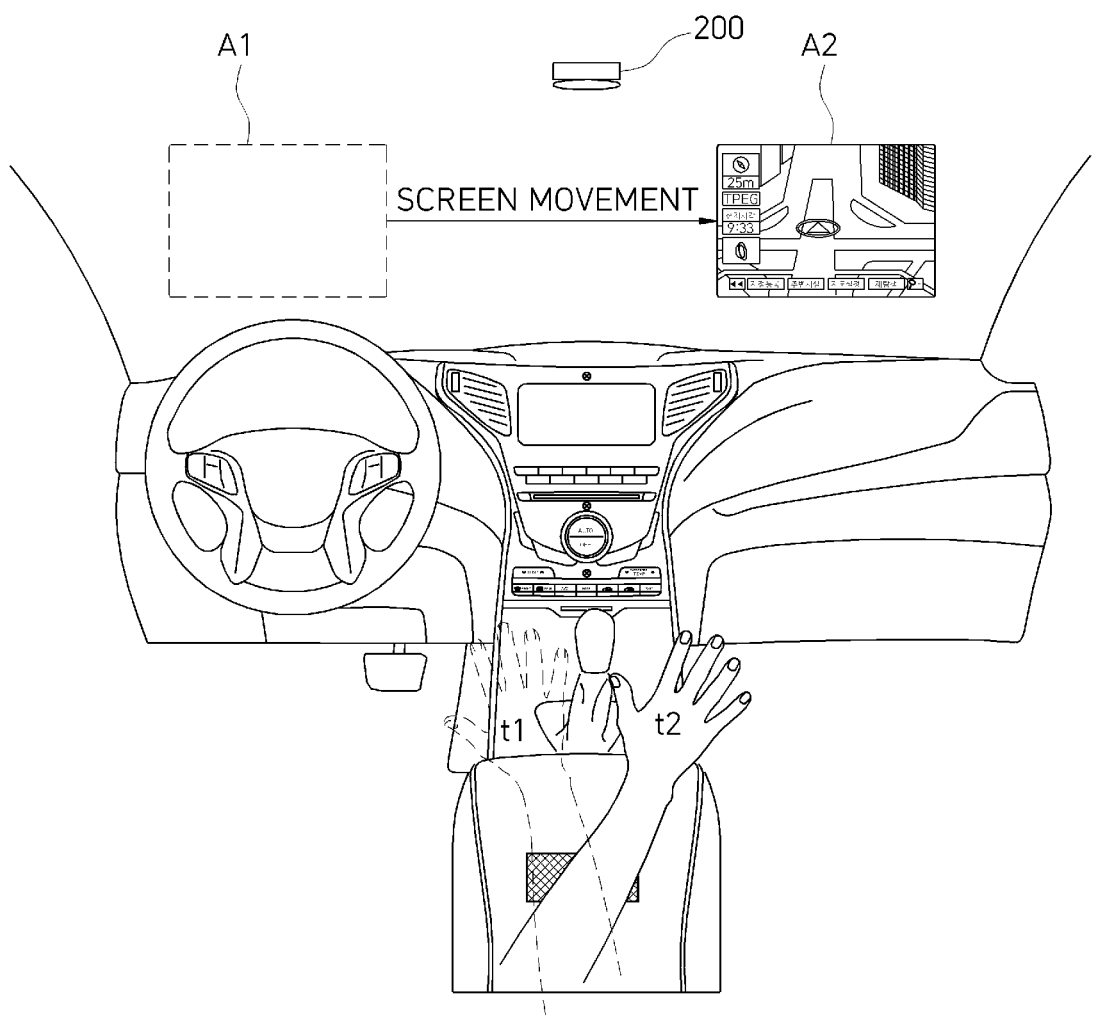
FIG. 14 is an exemplary diagram of a control corresponding to a gesture input upon detection of no pedestrian in a control system using an in-vehicle gesture input according to another embodiment of the present invention.

When there is no pedestrian ahead, the corresponding gesture of the driver is input to perform an original command (a command of moving content located in a first area to a second area) as shown in FIG. 14, and thus the area of the content is moved.

That is, according to this embodiment, it is possible to execute different functions for the same gesture according to the surrounding situation information (information regarding whether there is a pedestrian who is waiting to cross).

Figure 13:
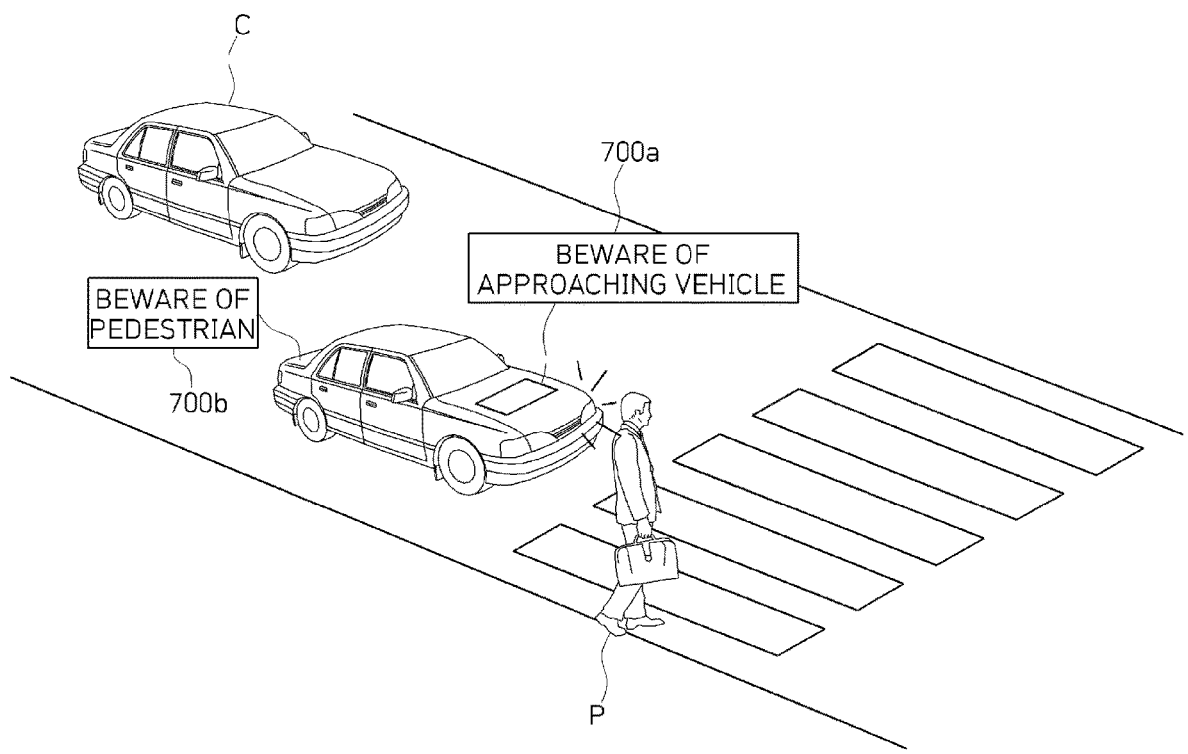
FIG. 13 is an exemplary diagram showing a warning indication for a nearby vehicle in a control system using an in-vehicle gesture input according to another embodiment of the present invention.

FIG. 13 is an exemplary diagram showing a warning indication for a nearby vehicle in a control system using an in-vehicle gesture input according to another embodiment of the present invention.

When a pedestrian P is crossing a road at a crosswalk in front of the vehicle and information regarding the presence of a vehicle C approaching from a rear side is received, the processor provides a warning notification to the vehicle C because the pedestrian is not visible due to the vehicle and thus there is a risk of collision with the pedestrian caused by the vehicle C.

The processor controls a lamp of the vehicle to blink in a direction in which the vehicle C is approaching and induces the deceleration of the vehicle C.

Alternatively, the processor displays a message "Beware of pedestrian ahead" through an external communication device 700b disposed on the rear side of the vehicle and induces the vehicle C to recognize information regarding the presence of a pedestrian ahead and then decelerate.

Also, the process switches a phrase of an external communication device 700a disposed on the front side of the vehicle to display a message "Beware of approaching vehicle," and thus induces the pedestrian P to perceive whether the vehicle C is approaching and then safely cross.

Figure 15:
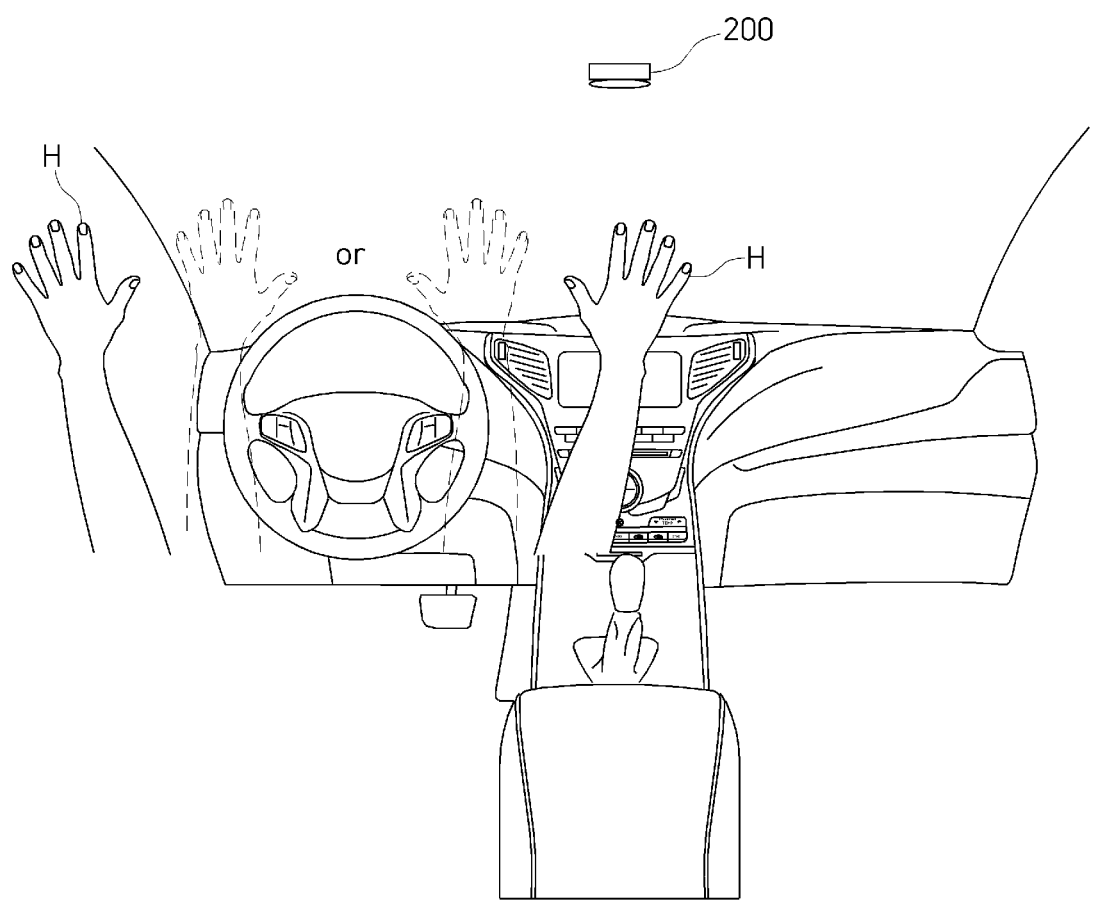
FIG. 15 is an exemplary diagram showing a gesture input for external communication to a nearby vehicle in a control system using an in-vehicle gesture input according to another embodiment of the present invention.

FIG. 15 is an exemplary diagram showing a gesture input for external communication to a nearby vehicle in a control system using an in-vehicle gesture input according to another embodiment of the present invention.

For example, when a user performs a gesture of lifting a hand H up to the left or right, the processor determines that the driver intends to obtain an understanding of a lane change (merging) and displays a message through an external communication device.

Figure 16:
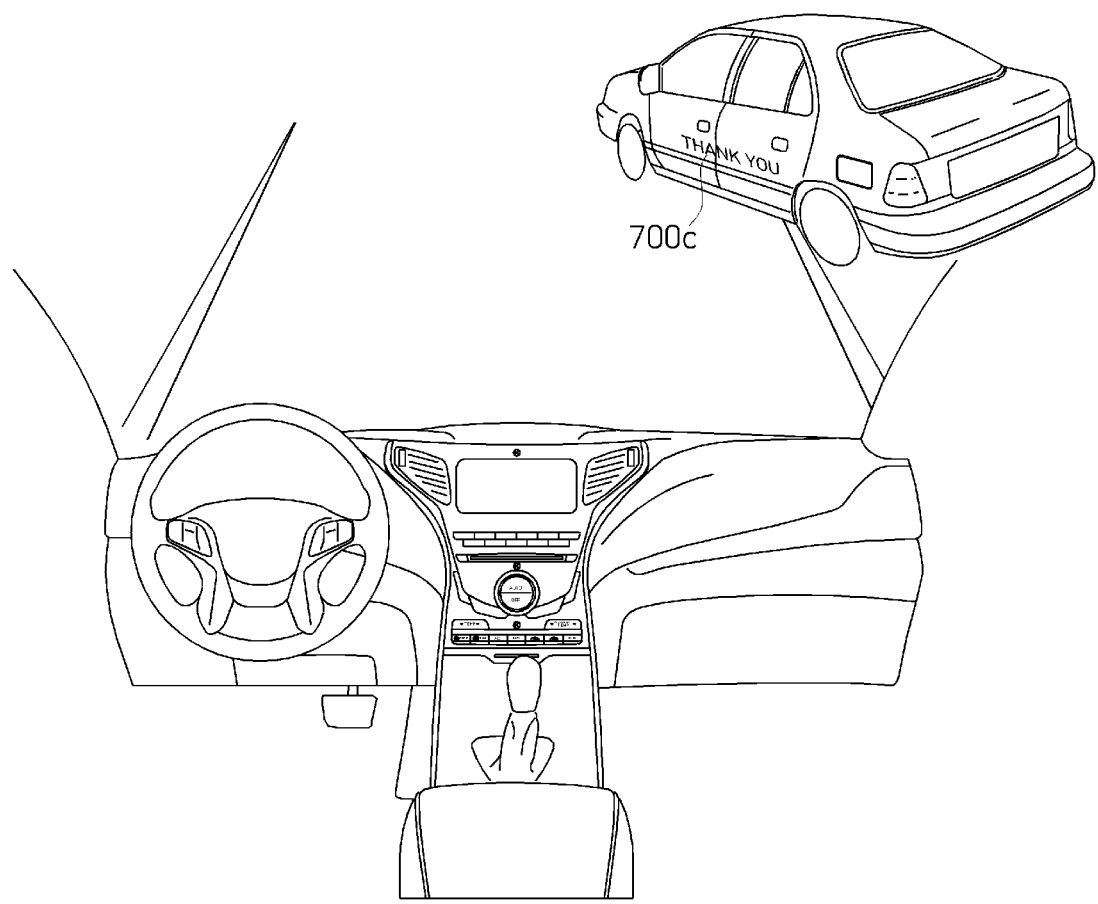
FIG. 16 is an exemplary diagram showing a phrase indication as an aspect of external communication to a nearby vehicle in a control system using an in-vehicle gesture input according to another embodiment of the present invention.

For example, as shown in FIG. 16, according to a gesture direction, turn signal lamps operate simultaneously, and the processor displays a phrase "Thank you" to obtain an understanding through an external communication device 700c disposed on a side of the vehicle.

In this case, it is preferable that the driver's gesture be recognized when the gesture is performed at a predetermined height or more from a seating posture.

When a lane change is completed, the processor displays a phrase "Sorry" to obtain an understanding through the external communication device disposed on the rear side of the vehicle.

Also, when the vehicle suddenly stops, the processor may display a phrase "Sorry" to obtain an understanding through the external communication device disposed on the rear side of the vehicle according to a gesture of the driver lifting a hand.

The processor provides different functions for the same gesture in consideration of the driver's gesture and driving history information.

For example, the processor provides a function of increasing the air blowing of the air conditioner (a first function)

according to the gesture of the driver lifting a hand in the case of a general deceleration situation, not an emergency stop situation, and provides a function of displaying a phrase "Sorry" to obtain an understanding (a second function) according to the gesture of the driver lifting a hand in an emergency stop situation.

Figure 17:
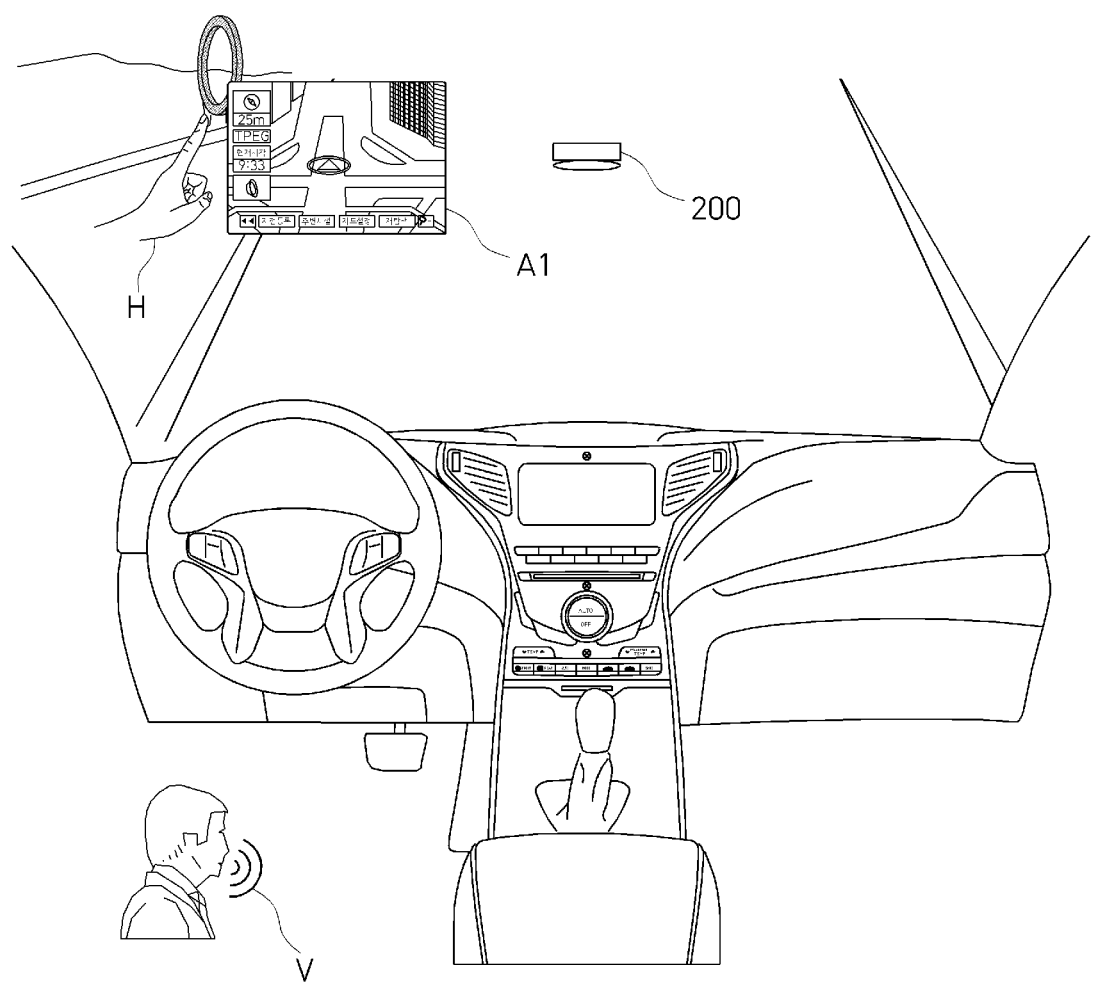
FIG. 17 is an exemplary diagram showing a driver's selection gesture and voice input in a situation where images are layered in a windshield in a control system using an in-vehicle gesture input according to another embodiment of the present invention.

FIG. 17 is an exemplary diagram showing a driver's selection gesture and voice input in a situation where images are layered in a windshield in a control system using an in-vehicle gesture input according to another embodiment of the present invention.

Referring to FIG. 17, the camera 200 delivers, to the input unit, gesture information input through a driver's hand H.

It is possible to determine what the driver's object (building or thing) of interest is by recognizing the driver's gaze direction in addition to the driver's hand H and performing eye-tracking.

FIG. 17 shows that navigation information (layer 2; navigation, entertainment, etc.) is displayed in a preset area A1 of an in-vehicle windshield (layer 1; main screen) and that a driver wants to check information regarding an outdoor object hidden by displaying navigation information while staring at the area A1.

That is, the driver inputs a gesture of selecting an object with his or her hand H and makes an utterance such as "Where is it?" and "Check information" through voice V.

Figure 18:
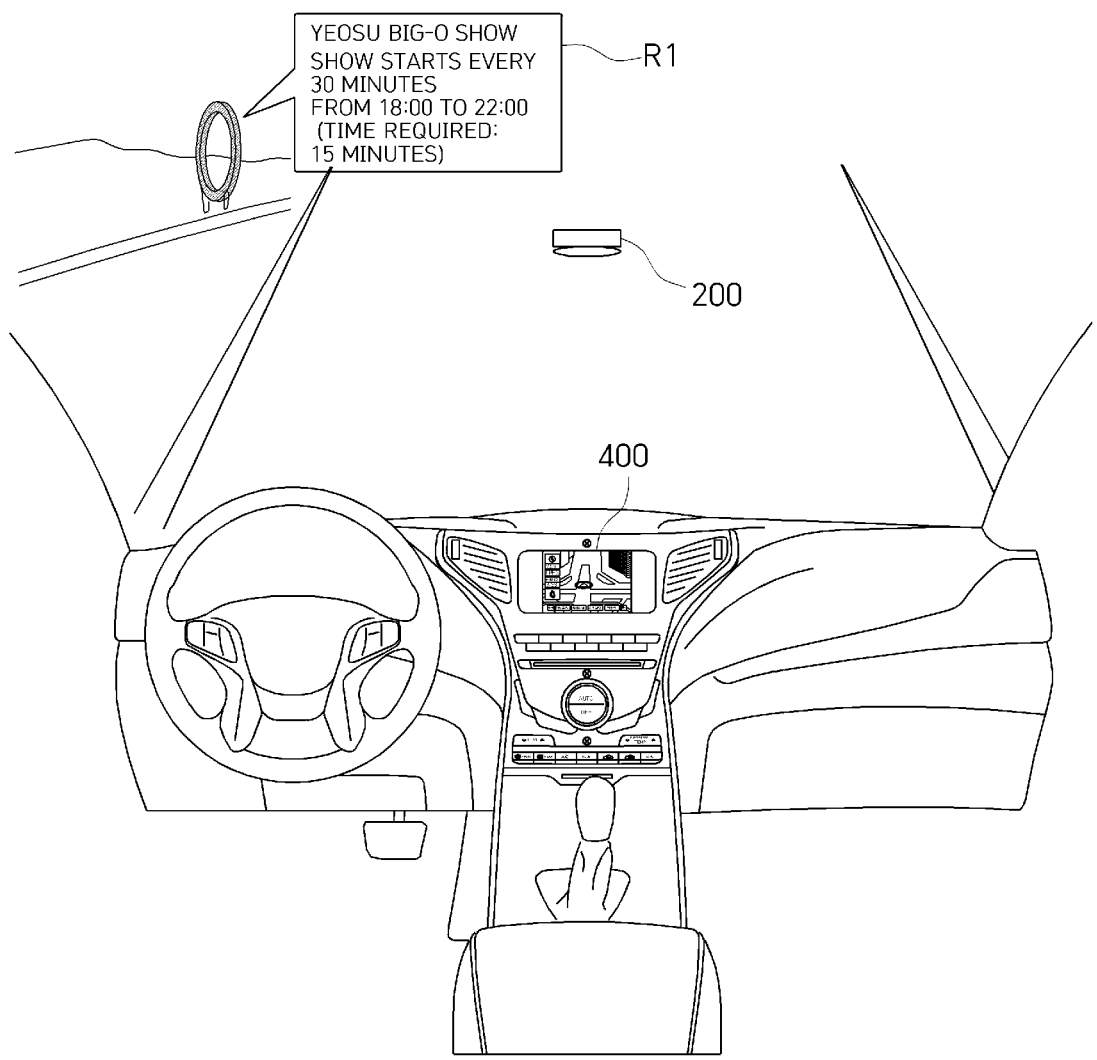
FIG. 18 is an exemplary diagram showing information display and image movement corresponding to a driver's selection gesture and voice input in a control system using an in-vehicle gesture input according to another embodiment of the present invention.

Referring to FIG. 18, the processor displays information regarding the driver's object of interest on the windshield according to the driver's input gesture and voice, as shown in FIG. 17.

For example, when the object is a sculpture for the Big-O Show located in Yeosu, South Korea, the performance information of the Big-O Show (start time: every 30 minutes from 18:00 to 22:00, time required: 15 minutes) may be displayed in a predetermined area R1 of the windshield and may be provided through voice as well as through text.

Also, in conjunction with the provision of such information, a subsequent function related to a reservation for a performance may be provided.

The above-described example is a description of a sculpture for a performance, and when the driver's object of interest is a restaurant, menu information, operation information, etc. are displayed, and a subsequent function such as the transmission of a reservation message for a restaurant reservation or the connection of a call to the restaurant is provided.

When the information regarding the driver's object of interest is displayed, navigation screen information that has been displayed in the area A1 is delivered to the AVN 400 of the vehicle and is displayed by the AVN 400.

When there are three or more layers and the above-described gesture input is made from the driver, it is possible to move and display each image to and on a plurality of displays (windshield, AVN, cluster, CMS monitor, and the like).

The processor performs a screen movement control to perform image layer processing and performs a control to display information to be preferentially shown according to a user's intention (information regarding a sculpture R) on a main screen (the windshield at which the driver is gazing) and to move an image which has been displayed on the main screen to a subsequent display (AVN, cluster, passenger seat display, etc.).

The processor may adjust the rankings of subsequent displays according to a vehicle driving mode (manual or autonomous driving).

In this case, by operations of the driver's gesture, voice, eye tracking, etc., a displayed screen may be moved to another display to display information, and the display may be automatically moved after a guidance voice indicating "Move to OO display" is provided.

Figure 19:
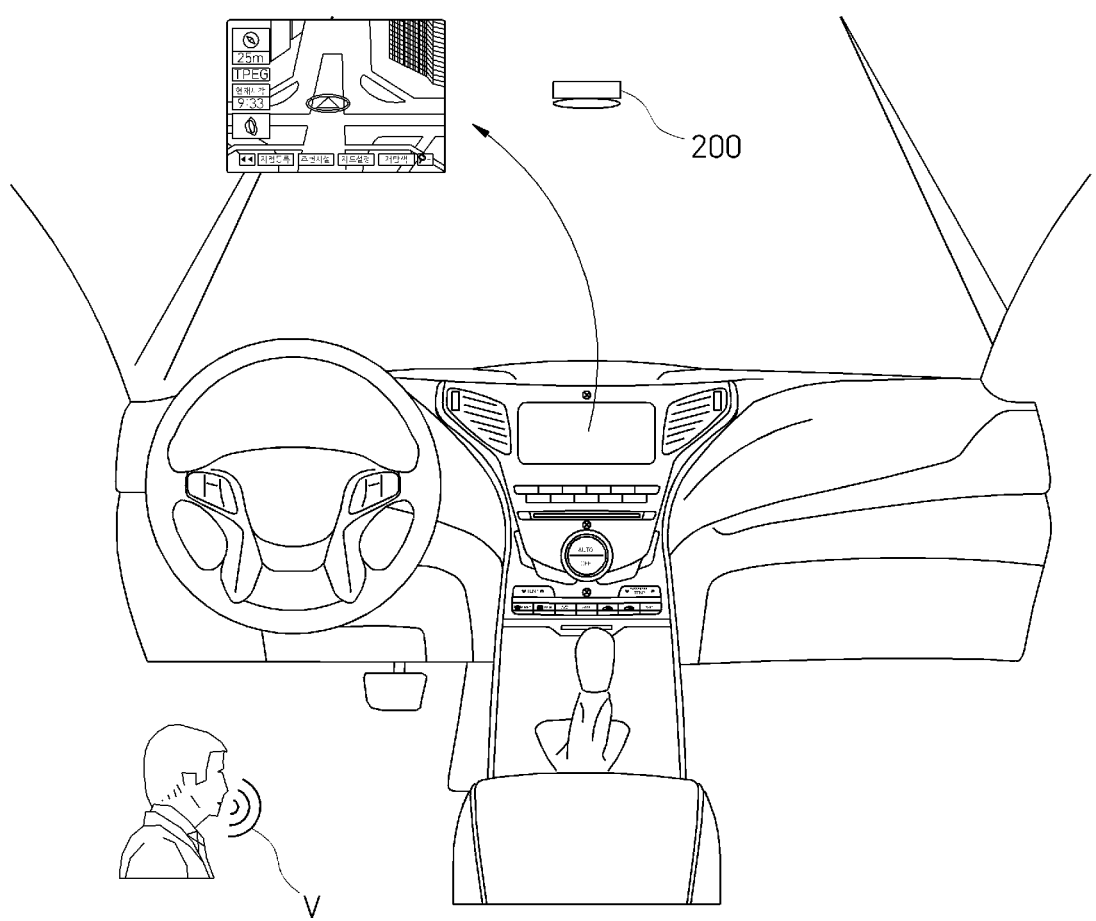
FIG. 19 is an exemplary diagram showing an image area return in a control system using an in-vehicle gesture input according to another embodiment of the present invention.

FIG. 19 is an exemplary diagram showing an image area return in a control system using an in-vehicle gesture input according to another embodiment of the present invention.

When the driver checks the above-described information regarding the sculpture and then makes an utterance such as "OK" or stops displaying the information regarding the sculpture through a swipe action or when a predetermined time (e.g., 20 seconds) has passed after the information regarding the sculpture is displayed, the navigation screen that has been moved to the AVN 400 is returned and moved back to the area A1 of the windshield where the navigation screen was displayed.

In this case, when the moved content is not real-time information such as a navigation screen (e.g., movie content), the movie content is temporarily paused at the time of movement as shown in FIG. 18 and replayed at the time of returning to the original area as shown in FIG. 19.

Meanwhile, the control method using an in-vehicle gesture input according to an embodiment of the present invention may be implemented in a computer system or recorded on a recording medium. The computer system may include at least one processor, memory, user input device, data communication bus, user output device, and storage. The above-described elements perform data communication through the data communication bus.

The computer system may further include a network interface coupled to a network. The processor may be a central processing unit (CPU) or a semiconductor device for processing instructions stored in a memory and/or a storage.

The memory and storage may include various types of volatile or non-volatile storage media. For example, the memory may include a read-only memory (ROM) and a random access memory (RAM).

Accordingly, the control method using an in-vehicle gesture input according to an embodiment of the present invention may be implemented as a computer-executable method. When the control method using an in-vehicle gesture input according to an embodiment of the present invention is performed by a computer device, computer-readable instructions may implement the control method according to the present invention.

Meanwhile, the control method using an in-vehicle gesture input according to an embodiment of the present invention may be embodied as computer-readable codes on a computer-readable recording medium. The computer-readable recording medium includes any type of recording medium in which data that can be decrypted by a computer system is stored. For example, the computer-readable recording medium may include a ROM, a RAM, a magnetic tape, a magnetic disk, a flash memory, an optical data storage device, and the like. Further, the computer-readable recording media can be stored and carried out as codes that are distributed in a computer system connected to a computer network and that are readable in a distributed manner.

According to an embodiment of the present invention, by performing a control to identify a gesture control input for each situation and executing a different function for each situation even when the same gesture is made to reduce the number of gestures to be learned by a driver to execute functions, it is possible to increase user convenience, and it is also possible for a driver to execute a desired function through an intuitive gesture input.

Advantageous effects of the present invention are not limited to the aforementioned effects, and other effects not described herein will be clearly understood by those skilled in the art from the above description.

The present invention has been described above with respect to embodiments thereof. Those skilled in the art should understand that various changes in form and details may be made therein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A control system for controlling vehicle functions using an in-vehicle gesture input, the control system comprising:
   an input unit configured to receive a user's gesture information;
   a memory configured to store a control program using an in-vehicle gesture input therein; and
   a processor configured to execute the control program, wherein:
   the processor transmits a command for executing a function corresponding to a gesture according to a usage pattern;
   the input unit receives usage pattern information contained in the user's gesture information and delivers the usage pattern information to the processor, and the processor provides different functions for the same gesture information; and
   the processor receives, as the usage pattern information, information regarding whether the user's arm is mounted on a touchpad and executes different functions for the same input gesture according to whether the user's arm is mounted on the touchpad.

2. The control system of claim 1, further comprising an in-vehicle three-dimensional (3D) camera configured to recognize the gesture information.

3. The control system of claim 1, wherein the processor changes and displays a user interface according to whether a preset condition is satisfied through the usage pattern information, and executes a preset function according to an air touch manipulation.

4. The control system of claim 1, wherein the input unit receives state information of a driver and selectively provides a function according to the gesture and state information of the driver.

5. The control system of claim 4, wherein the input unit receives emotion state information from a terminal carried by the driver.

6. The control system of claim 4, wherein the processor selectively provides different functions for the same gesture information according to a result of classifying the driver's state.

7. The control system of claim 6, wherein when the driver's state corresponds to a first class, the processor selectively provides a function of inducing the driver's state to be switched to a second class.

8. The control system of claim 4, wherein the processor determines a vehicle driving mode according to a result of classifying the driver's state.

9. The control system of claim 1, wherein the input unit receives surrounding situation information, and the processor transmits a command for executing different functions for the same gesture according to the user's gesture and the surrounding situation information.

10. The control system of claim 9, wherein the processor performs a control to display a pedestrian guidance message according to the user's gesture in consideration of, as the surrounding situation information, information associated with the presence of a pedestrian who is waiting to cross at a crosswalk in front of the vehicle or who is crossing the crosswalk.

11. The control system of claim 10, wherein the processor performs a control to display, as the pedestrian guidance message, at least one of a text message using an external communication device, an audio message using a speaker, and a message using a lighting device.

12. The control system of claim 1, wherein the input unit receives the user's voice, and the processor transmits a device control command according to the user's gesture and voice.

13. The control system of claim 12, wherein the processor delivers a message corresponding to the voice for an external object selected from the user's gesture.

14. The control system of claim 12, wherein the processor selects an in-vehicle device in consideration of the gesture and controls a function of the selected in-vehicle device in consideration of the voice.

15. A control method for controlling vehicle functions using an in-vehicle gesture input, the control method comprising:
   (a) receiving operation state information and a gesture;
   (b) determining whether the operation state information satisfies a preset condition; and
   (c) providing different functions for the gesture according to whether the preset condition is satisfied in operation (b),
   wherein the operation state information regarding whether mounting is performed on a touchpad is received in operation (a), and a first function is executed in operation (c) when it is determined in operation (b) that the gesture is received while the mounting is performed on the touchpad, and a second function is executed in operation (c) when it is determined in operation (b) that the gesture is received while the mounting is performed on the touchpad.

16. The control method of claim 15, wherein, in operation (a), the gesture is received through a user interface which is changed and provided according to the detection of the operation state information.

* * * * *